United States Patent [19]
Takizawa et al.

[11] Patent Number: 6,145,022
[45] Date of Patent: Nov. 7, 2000

[54] INJECTION MOLDING SYSTEM TRANSFERRING A SELECTED COMPUTER PROGRAM TO A CONTROLLER OF AN ARBITRARY INJECTION MOLDING MACHINE

[75] Inventors: Michiaki Takizawa; Takashi Magario; Yoshitomi Uchikawa; Kazuo Usui; Takashi Hakoda, all of Nagano, Japan

[73] Assignee: Nissei Plastic Industrial Co., Ltd., Nagano-Ken, Japan

[21] Appl. No.: 09/035,938

[22] Filed: Mar. 6, 1998

[30] Foreign Application Priority Data

Mar. 7, 1997 [JP] Japan ..................................... 9-052732

[51] Int. Cl.⁷ ................................................. G05B 19/04
[52] U.S. Cl. ............................ 710/10; 700/200; 700/201; 700/204; 710/8
[58] Field of Search .................................. 700/146, 200, 700/201, 204; 717/11; 710/8, 10

[56] References Cited

U.S. PATENT DOCUMENTS

| | | | |
|---|---|---|---|
| 3,760,251 | 9/1973 | Posl et al. ................................ | 318/601 |
| 5,216,617 | 6/1993 | Kamiguchi et al. ................ | 364/475.06 |
| 5,266,878 | 11/1993 | Makino et al. ........................... | 318/571 |
| 5,301,120 | 4/1994 | Magario .............................. | 364/475.06 |
| 5,316,707 | 5/1994 | Stanciu et al. .......................... | 264/40.1 |
| 5,757,648 | 5/1998 | Nakamura .......................... | 364/474.11 |

FOREIGN PATENT DOCUMENTS

| | | |
|---|---|---|
| 35123 | 1/1991 | Japan . |
| 7266395 | 10/1995 | Japan . |

OTHER PUBLICATIONS

Abstract of Prior Arts, Japanese Patent Appln. Laid Open No. 3(1991) 5123.

Abstract of Prior Arts, Japanese Patent Appln. Laid Open No. 3(1991) 266395.

*Primary Examiner*—Thomas C. Lee
*Assistant Examiner*—Ilwoo Park
*Attorney, Agent, or Firm*—Birch, Stewart, Kolasch & Birch, LLP

[57] ABSTRACT

An injection molding system includes a program control section installed outside injection molding machines. The program control section includes a program file section that stores a plurality of different programs in the form of files, and a program transfer section that selects a computer program from the program file section and transfers the selected computer program to the controller of an arbitrary injection molding machine when the arbitrary injection molding machine is operated. Only when an injection molding machine is operated, a program (control program) for operating the injection molding machine is selected from the program file section of the program control section, and the thus-selected program is transferred to the corresponding controller by the program transfer section.

11 Claims, 3 Drawing Sheets

INJECTION MOLDING SYSTEM TRANSFERRING A SELECTED COMPUTER PROGRAM TO A CONTROLLER OF AN ARBITRARY INJECTION MOLDING MACHINE

BACKGROUND OF THE INVENTION

1. Field of the Invention

The present invention relates to an injection molding system that includes one or more injection molding machines, each equipped with a controller that operates in accordance with a computer program.

2. Description of the Related Art

In general, injection molding machines are equipped with a controller for performing various kinds of control, and a computer program (hereinafter simply referred to as a "program") for performing the various kinds of control is stored in a memory provided in the controller.

Conventionally, such a program is stored in the memory of the controller in the course of manufacture of the controller or the injection molding machine at a manufacturer's plant. That is, a P-ROM in which a program has been written in advance is installed in the controller in the course of manufacture of the controller, or a program is written in a P-ROM which has been built into the controller, through the use of a program developing apparatus.

Since the amount of program data has increased in recent years due to enhanced performance and an increased number of functions of injection molding machines, the program data has been become difficult to store in a P-ROM, whose storage capacity is limited. In order to cope with this problem, there has been employed a technique in which a hard-disk drive is built into a controller, and a control program and various kinds of data are stored in the hard-disk drive (see Japanese Patent Application Laid-Open (kokai) Nos. 3(1991)-5123 and 7(1995)-266395).

However, the technique in which a hard-disk drive is built into a controller has the following problems.

First, in many cases, controllers mounted on injection molding machines are placed under severe conditions such as exposure to vibration (shock), high temperature, and dust. Therefore, there exists a fear that a precision hard-disk drive will cause error or failure, or that a program stored in the hard-disk drive will become erased or damaged. Therefore, such a technique is disadvantageous from the viewpoint of reliability and safety.

Second, a hard-disk drive—which is an expensive device—must be incorporated into the controller, resulting in an increase in the size and cost of the controller.

Third, every time a program is replaced with an upgraded version, an installation operation must be performed through use of a CD-ROM or the like.

SUMMARY OF THE INVENTION

An object of the present invention is to provide an injection molding system which can cope with an increase in the amount of program data used in a controller, while installation of a hard-disk drive is avoided in order to avoid failures, erroneous operation, and disappearance of the program date—which would otherwise occur due to use of a hard-disk drive—to thereby enhance reliability and safety, and which can reduce the size and cost of the controller.

Another object of the present invention is to provide an injection molding system which eliminates the necessity of cumbersome program installation, which would otherwise be required, for example, when the program is upgraded.

To achieve the above objects, the present invention provides an injection molding system which comprises one or more injection molding machines, each equipped with a controller that operates in accordance with a program, and a program control section installed outside the injection molding machines. The program control section comprises a program file section that stores a plurality of different programs in the form of files, and a program transfer section that selects a program from the program file section and transfers the selected program to the controller of an arbitrary injection molding machine when the arbitrary injection molding machine is operated.

Therefore, only when an injection molding machine is operated, a program (control program) for operating the injection molding machine is selected from the program file section of the program control section, and the thus-selected program is transferred to the corresponding controller by the program transfer section and is stored in a memory of the controller. Subsequently, the controller; i.e., the injection molding machine, operates in accordance with the program stored in the memory.

DETAILED DESCRIPTION OF THE PREFERRED EMBODIMENT

An embodiment of the present invention will now be described in detail with reference to the attached drawings, which are provided to facilitate understanding of the invention and do not limit the scope of the invention thereto. To clarify the invention, detailed description of known parts is omitted.

First, the structure of an injection molding system 1 according to an embodiment of the present invention will be described with reference to FIGS. 1 and 2.

Figure 1:
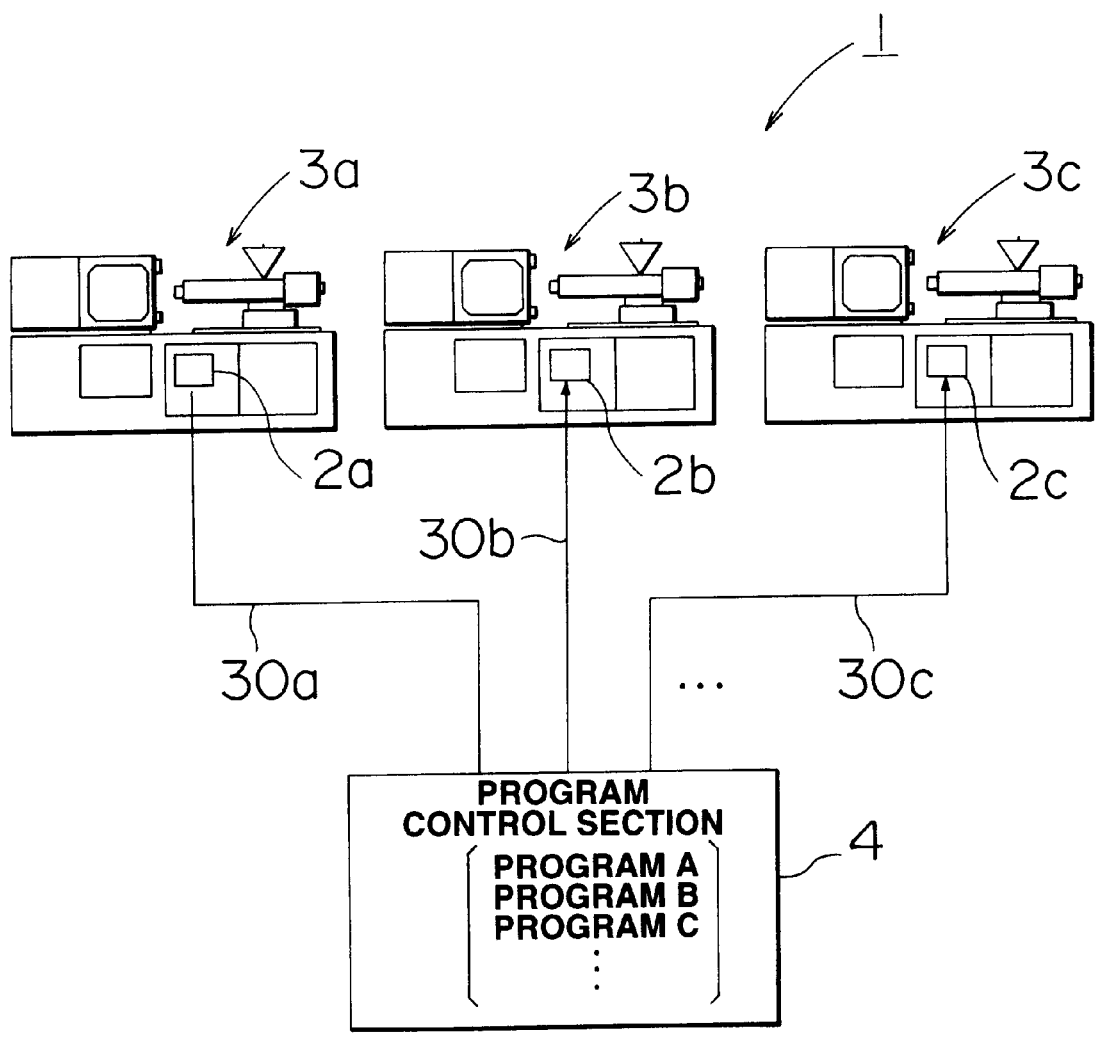
FIG. 1 is a schematic view of an injection molding system according to an embodiment of the present invention.
Figure 2:
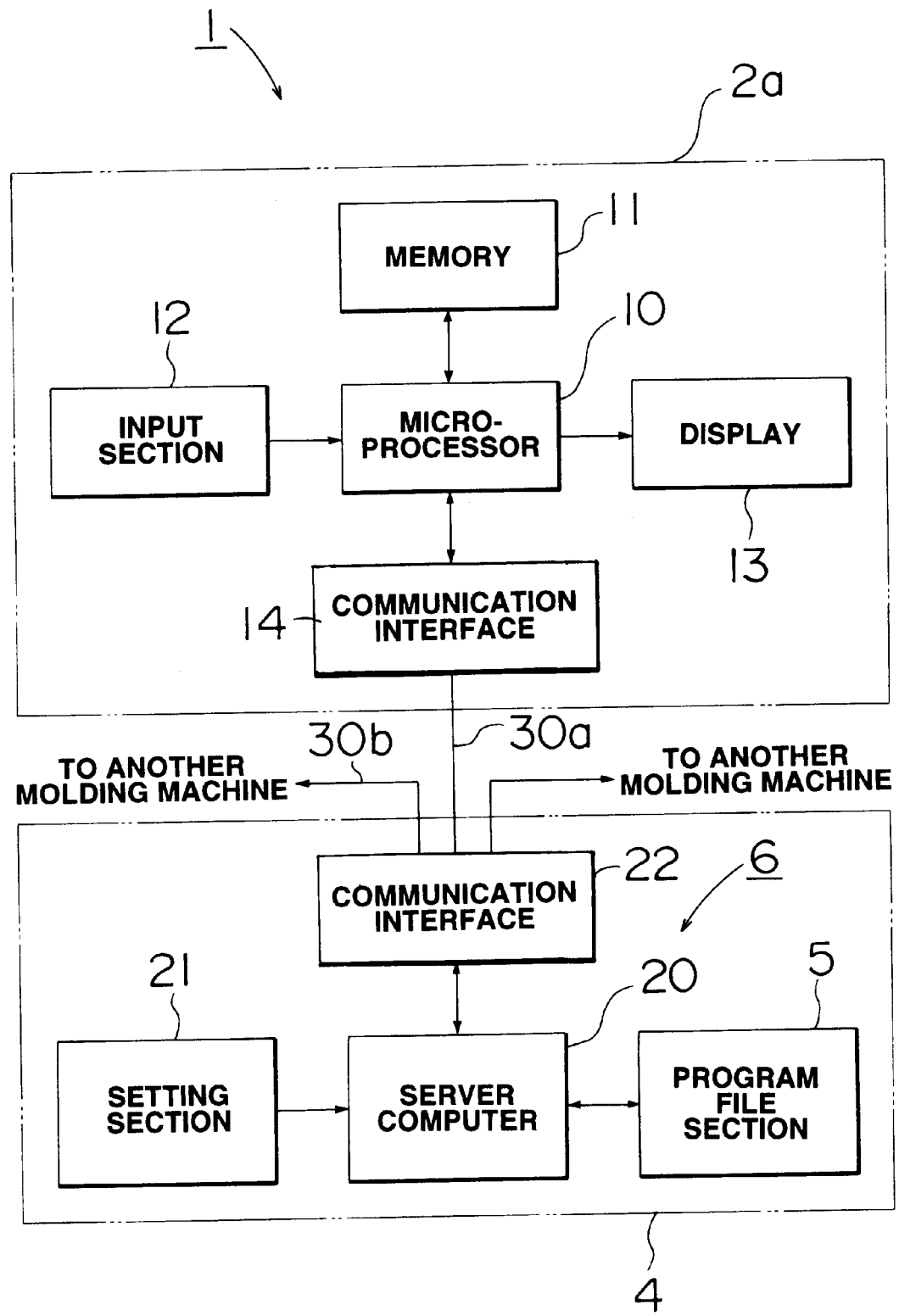
FIG. 2 is a block diagram of the injection molding system.

In FIGS. 1 and 2, numerals 3a, 3b, 3c, etc. denote a plurality of injection molding machines. Controllers 2a, 2b, 2c, etc. are respectively mounted on the injection molding machines 3a, 3b, 3c, etc. Each of the controllers 2a, 2b, 2c, etc. includes a microprocessor 10 providing a computer function. To the microprocessor 10 are connected a memory 11, an input section 12 such as a keyboard, a display 13 for displaying various kinds of information, and a communication interface 14. The memory 11 is formed of a temporary memory, such as a RAM or an EEP-ROM, that has an empty area available for temporarily storing a program (control program). Therefore, none of the controllers 2a, 2b, 2c, etc. has a storage function for storing data and control programs, although each of them has a sequence control function and a local operation function.

Outside the injection molding machines 3a, 3b, 3c, etc. is installed a program control section 4, which includes a program file section 5 and a program transfer section 6. The program file section 5 utilizes a storage unit having a large storage capacity in order to store a plurality of different programs (e.g., control programs) A, B, C, etc. in the form of files.

The program transfer section 6 includes a server computer 20. A setting section 21 and a communication interface 22 are connected to the server computer 20. The setting section 21 is used for selecting a program A, B, C, etc. to be transferred to the controller 2a, etc. of the injection molding machine 3a, etc. The program transfer section 6 functions such that when an arbitrary injection molding machine is to be operated, the program transfer section 6 transfers a program A, etc. selected from the program file section 5 to the controller 2a, etc. of the arbitrary injection molding machine 3a, etc.

The communication interface 22 is connected to the interfaces 14 of the controllers 2a, 2b, 2c, etc. mounted on the injection molding machines 3a, 3b, 3c, etc. via respective communication lines 30a, 30b, 30c, etc. Various types of wire lines (RS-232C, RS-485, etc.), LAN, radio communication, optical communication, phone lines, and the like can be used to form the communication lines 30a, etc. By means of the communication lines 30a, etc., the program control section 4 and the controllers 2a, 2b, 2c, etc. are connected with each other so that intercommunication can be performed therebetween. When a LAN is constructed, in addition to a function of transferring a basic operation function and various programs, there can be provided a function of transmitting and receiving molding conditions, operating status data, production control information, quality control information, automatic control information, and the like.

Figure 3:
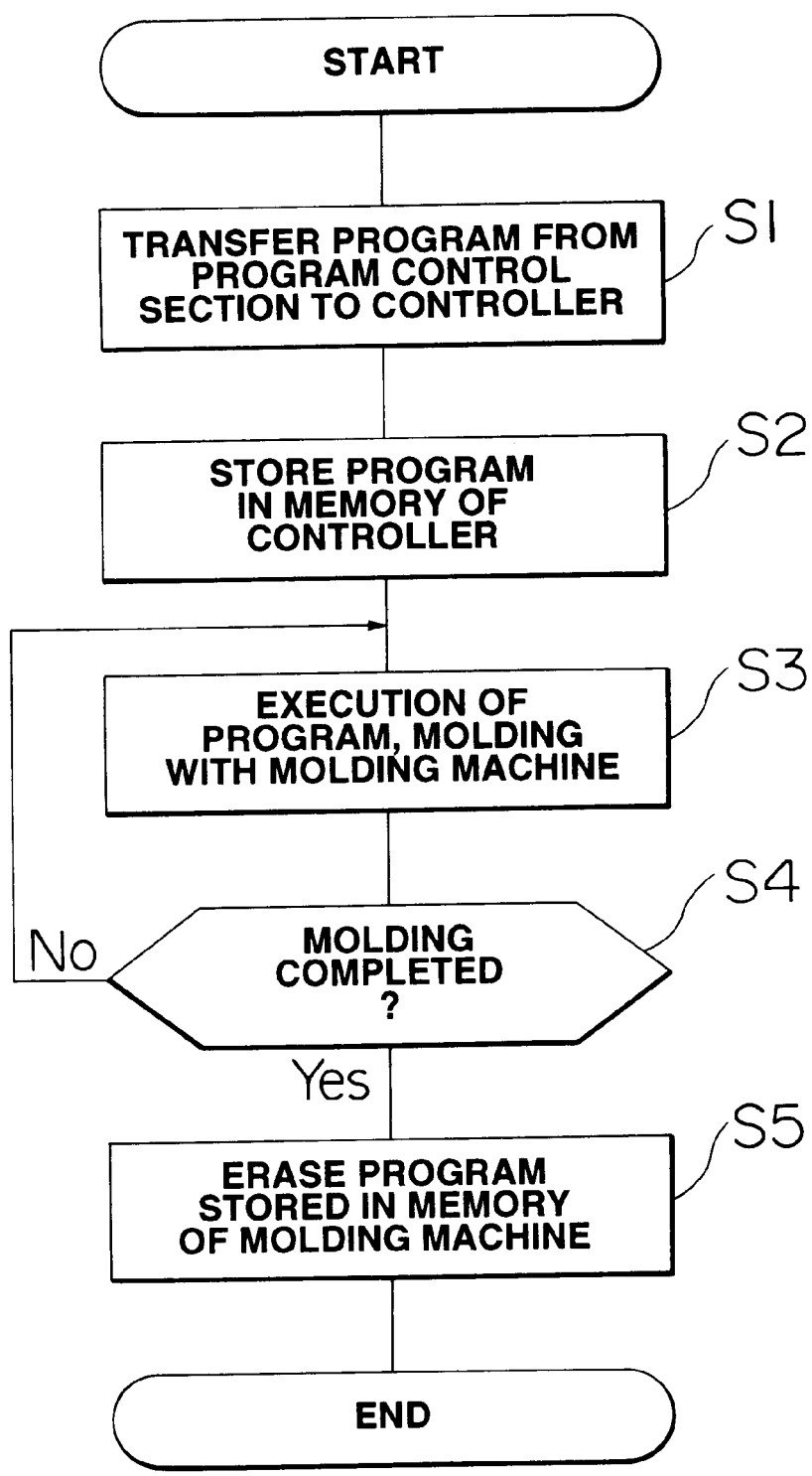
FIG. 3 is a flowchart showing the operation (function) of the injection molding system.

Next, the basic operation (function) of the injection molding system according to the present embodiment will be described with reference to the flowchart shown in FIG. 3.

First, a plurality of different programs A, B, C, etc., necessary for operation of the injection molding machines 3a, 3b, 3c, etc. are stored in the program file section 5 of the program control section 4. Examples of such programs include a molding machine operation program (control program), and a program for setting and displaying data.

Here, it is assumed that a certain product is molded through use of the injection molding machine 3a. First, the injection molding machine 3a is designated with the setting section 21, and the control program A for molding the product is selected from the program file section 5. As a result, the selected program file A is read out from the program file section 5 and transferred to the controller 2a of the injection molding machine 3a via the communication line 30a (step S1). The thus-transferred control program is written into an available area of the memory 11 and is stored therein (step S2). When a previous control program is stored in the memory 11, the previous control program is replaced with the transmitted program.

Subsequently, the controller 2a executes the program A to cause the injection molding machine 3a to mold (produce) the product (step S3). After the injection molding machine 3a has completed a series of molding (production) steps, the control program A of the controller 2a is erased (steps S4 and S5).

As described above, in the injection molding system of the present invention, the program transferred to the memory 11 of the controller 2a, etc. is not an optional program to be added to a control program but the control program itself, which is a fundamental program. Further, the control programs are completely controlled or managed by the program control section 4. Basically, each time the controller 2a, etc. requires a control program, the program control section 4 transfers the program to the controller 2a, etc., so that the controllers 2a, etc. do not carry unnecessary programs. Therefore, the memory installed in the controllers 2a, etc. can be a memory that can temporarily store a necessary control program, and a hard-disk drive does not have to be installed. Thus, the reliability and safety of the controllers 2a, etc. can be enhanced from the viewpoint of protection of programs. In addition, the size and cost of the controllers 2a, etc. can be reduced. Moreover, even when the programs are upgraded, installation operations that involve operation of the controllers 2a, etc. Are not required.

The present invention is not limited to the above-described embodiments. Regarding structural details, shape, method, and the like, modifications and any omission or addition may be possible as needed without departing from the scope of the invention.

For example, the injection molding system may include a single molding machine. In the above-described embodiment, the program stored in the memory 11 and used in a previous operation is erased immediately after the operation, in consideration of safety. However, the program stored in the memory 11 and used in a previous operation may be replaced with a newly transferred program. The present invention does not exclude a case where a new program is successively added when the memory 11 has an available empty area.

In the above-described embodiment, program selection is performed through use of the setting section 21 of the program control section 4. However, a program may be selected through use the input section 12 of the controllers 2a, etc. of the injection molding machines 3a, etc. Alternatively, a bar code that is attached to a die and represents an ID and/or data may be read out by a bar-code reader in order to request a program from the side of the injection molding machines 3a, etc. Therefore, the program control section 4 may be active equipment or passive equipment, provided that it has a capability of transferring programs. Further, since the controllers 2a, etc. and the program control section 4 are connected with each other for intercommunication, various data, such as operation status data, collected by the controllers 2a, etc. can be transmitted to the program control section 4 in order to be subjected to data management performed by the program control section 4. Moreover, in addition to the control program, any kind of program may be transferred.

What is claimed is:
1. An injection molding system comprising:
   one or more injection molding machines, each injection molding machine equipped with a controller that operates in accordance with a computer program, wherein a program control section is installed outside said injection molding machines,
   said program control section comprising a program file section that stores a plurality of different computer programs in the form of files, and
   a program transfer section that selects a computer program from said program file section and transfers the selected computer program to the controller of an arbitrary injection molding machine when said injection molding machine is operated, wherein the computer program transferred to said controller of said arbitrary injection molding machine is erased upon completion of operation of the corresponding molding machine.
2. An injection molding system according to claim 1, wherein said controller includes a memory that can temporarily store the computer program transferred from said program transfer section.

3. An injection molding system according to claim 1, wherein the computer program transferred to said controller is replaced with a newly transferred computer program.

4. An injection molding system according to claim 1, wherein said computer program is a control program.

5. An injection molding system according to claim 1, wherein said controller and said program transfer section are connected with each other in order to perform intercommunications between said controller and said program transfer section.

6. An injection molding system according to claim 1, wherein the computer program to be transferred to said controller is selected by said program control section.

7. An injection molding system comprising:

one or more injection molding machines, each injection molding machine equipped with a controller that operates in accordance with a computer program, wherein a program control section is installed outside said injection molding machines, said program control section comprising a program file section that stores a plurality of different computer programs in the form of files, and a program transfer section that selects a computer program to be transferred from said program file section and transfers the selected computer program to the controller of an arbitrary injection molding machine when said injection molding machine is operated, wherein the controller of the arbitrary injection molding machine selects said computer program to be transferred to the controller.

8. An injection molding system according to claim 7, wherein said controller includes a memory that can temporarily store the computer program transferred from said program transfer section.

9. An injection molding system according to claim 7, wherein a computer program transferred to said controller is replaced with a newly transferred computer program.

10. An injection molding system according to claim 7, wherein said computer program is a control program.

11. An injection molding system according to claim 7, wherein said controller and said program transfer section are connected with each other in order to perform intercommunications between said controller and said program transfer section.

* * * * *